United States Patent [19]
Eibl

[11] Patent Number: 5,632,256
[45] Date of Patent: May 27, 1997

[54] INTERNAL COMBUSTION ENGINE WITH AN EXHAUST GAS TURBOCHARGER

[75] Inventor: Markus Eibl, Stuttgart, Germany

[73] Assignee: Mercedes-Benz AG, Stuttgart, Germany

[21] Appl. No.: 606,093

[22] Filed: Feb. 3, 1996

[30] Foreign Application Priority Data

Mar. 7, 1995 [DE] Germany .......................... 195 07 961.2

[51] Int. Cl.$^6$ ...................................... F02B 29/04
[52] U.S. Cl. ........................................ 123/563; 165/297
[58] Field of Search ................... 60/599; 123/563; 165/297

[56] References Cited

U.S. PATENT DOCUMENTS 2,164,605  7/1939  Young ........................................ 165/297

FOREIGN PATENT DOCUMENTS

| 36 27 686 | 11/1987 | Germany . | |
| 39 29 123 | 3/1990 | Germany . | |
| 59-145325 | 8/1984 | Japan | 60/599 |
| 61-237998 | 10/1986 | Japan | 123/563 |
| 62-46194 | 2/1987 | Japan | 123/563 |
| 3-260324 | 11/1991 | Japan | 123/563 |

Primary Examiner—Michael Koczo
Attorney, Agent, or Firm—Klaus J. Bach

[57] ABSTRACT

In an internal combustion engine with an exhaust gas turbocharger which supplies compressed charge air to the engine via a charge air duct including an intercooler with a housing and a cooling structure for cooling the compressed charge air before it is supplied to the engine, the intercooler housing has an inlet area connected to the turbocharger by an upstream section of the charge air duct and an outlet area connected to the engine by a downstream section of the charge air duct and an air flow control mechanism which is arranged between the inlet and outlet areas and operable to be open during engine warm-up when the engine is below a predetermined temperature so that the charge air by-passes the cooling structure during engine warm-up.

7 Claims, 1 Drawing Sheet

INTERNAL COMBUSTION ENGINE WITH AN EXHAUST GAS TURBOCHARGER

BACKGROUND OF THE INVENTION

The invention resides in an internal combustion engine with an exhaust gas turbocharger, an intercooler and a control unit with a temperature sensor sensing the engine operating temperature for controlling the supply of compressed air to the engine.

DE OS 3929 123 discloses such an internal combustion engine wherein the air intake pipe includes an intercooler and a by-pass duct for by-passing the intercooler. The charge air flow by-passes the intercool until the engine has reached a predetermined operating temperature under the control of a control arrangement which is dependent on the engine operating temperature. When this operating temperature is sensed by a temperature sensor mounted on the engine, the control arrangement switches the charge air flow to pass through the intercooler.

The by-pass duct by-passing the intercooler is connected to the intake pipe upstream and downstream of the intercooler by means of a switching device arranged in the intake pipe. Such an arrangement requires the control of two spaced switching devices which is complicated and requires an expensive design for the by-pass duct for by-passing the intercooler.

These disadvantages are partially eliminated by the arrangement disclosed in DE OS 36 27 686 wherein a by-pass line branching off the charge air pipe and by-passing the intercooler is controllable by a single switching device. No switching device is provided at the downstream end of the by-pass line. This arrangement is simplified as only one switching device is provided and only one switching device needs to be controlled but there is still the need for the additional by-pass conduit. It is also noted that, at the jointures of the by-pass conduit, that is, where it branches off the charge air pipe, as well as where it rejoins the charge air pipe, there are unfavorable air flow conditions because of restrictions in the relatively small air flow passages.

It is the object of the present invention to provide for an internal combustion engine with an exhaust gas turbocharger and an intercooler in which the charge air is cooled after the engine has reached a certain operating temperature but which is by-passed during engine warm-up including an arrangement for controlling the charge air flow which is simple in design, inexpensive to manufacture and reliable in operation.

SUMMARY OF THE INVENTION

In an internal combustion engine with an exhaust gas turbocharger which supplies compressed charge air to the engine via a charge air duct including an intercooler with a housing and a cooling structure for cooling the compressed charge air before it is supplied to the engine, the intercooler housing has an inlet area connected to the turbocharger by an upstream section of the charge air duct and an outlet area connected to the engine by a downstream section of the charge air duct and an air flow control mechanism which is arranged between the inlet and outlet areas and operable to be open during engine warm-up when the engine is below a predetermined temperature so that the charge air by-passes the cooling structure during engine warm-up.

By arranging the switching device within the intercooler housing the charge air can be supplied to the intercooler by a direct upstream charge air duct and from the intercooler to the engine by a direct downstream duct. The switching device in the intercooler permits the air to flow from the upstream duct directly into the downstream duct without passing the intercooler heat exchanger as long as the engine has not reached operating temperature so that during this period the air is not cooled in the intercooler. This results in better combustion. Also, enrichment of the air-fuel mixture can be maintained at a relatively low level and only for a relatively short period of time whereby the amount of poisonous emissions, particularly of hydrocarbons and carbon monoxide, is reduced. Also, the direct supply of the charge air from the compressor to the engine which causes a relatively fast increase of the charge air temperature is advantageous for the catalytic converter arranged in the exhaust gas system. By the arrangement of the switching device in the intercooler housing the need for a by-pass conduit is eliminated providing for a compact arrangement that saves valuable space in the engine compartment; it also reduces the amount of components to be assembled and the amount of time required for assembly and is therefore highly cost effective. And the compact, clean design also improves the appearance of the engine compartment.

In a preferred embodiment of the invention the switching device closes the direct communication path between the upstream and the downstream charge air ducts when the engine reaches a certain operating temperature so that, then, all of the charge air is conducted through the intercooler heat exchanger. This prevents the disadvantageous effects obtained with high charge air temperatures such as knocking and damage to the catalytic converter which may result from excessive exhaust gas temperatures. The switching device is disposed in the direct flow path between the entrance of the upstream charge air duct to the intercooler housing and the exit of the downstream charge air duct from the intercooler housing. Closing of the switching device forces all of the charge air to flow through the intercooler heat exchanger.

In a further advantageous embodiment of the invention the exhaust gas turbocharger is directly connected to the intercooler by a continuous charge air duct. This results in a simple streamlined arrangement of the charge air supply duct wherein the charge air is supplied to the intercooler with an almost undisturbed flow profile and without turbulence losses.

In another advantageous embodiment of the invention the intercooler includes, at one side thereof, an inlet and an outlet area, each provided with a connecting piece for the connection of the charge air ducts. This again makes it possible for the charge air flow to pass directly from the inlet area to the outlet area when the switching device is open whereby the charge air can flow directly into the downstream supply duct. Because the intercooler heat exchanger represents a substantial flow resistance most of the charge air will flow directly from the entrance area to the exit area and to the engine when the switching device is open so that there is no need to close off the passage through the heat exchanger.

In still another advantageous embodiment the connecting pieces mounted to the inlet and outlet areas are arranged essentially in parallel with one another and at a small distance from the switching device. This provides for a compact arrangement with short flow passages. Also, flow guide baffles may be provided in the inlet and outlet areas for guiding the air flow through the inlet and outlet areas with minimal losses.

Furthermore the switching device may be in the form of a flap valve by which the flow cross-section from the inlet to the outlet area can be adjusted preferably in a stepless fashion. In this manner the switching device can provide for a flow cross-section depending on the engine operating conditions such that some of the air flows directly from the inlet area to the outlet area and some flows through the intercooler.

Preferably, the switching device is controllable by an operator which is operatively connected to a temperature sensor so that the position of the flap can be adjusted in dependence on the engine operating temperature. By means of an engine management computer, values other than the engine operating temperature can be additionally utilized for the control of the flap position. Depending on the type of switching device, the operator can be a mechanical, an electronic, an electro-pneumatic, a pneumatic, a magnetic or a hydraulic device. Consequently the switching device may be a flap valve, a magnetic valve or a pneumatically operated valve. Preferably, the switching device is capable of withstanding high temperatures and high pressures which may be effective on the switching device particularly in its closed state. But it is also possible to utilize a two-way switching device.

The invention will be described in greater detail on the basis of the accompanying drawings.

DESCRIPTION OF A PREFERRED EMBODIMENT

Figure 1:
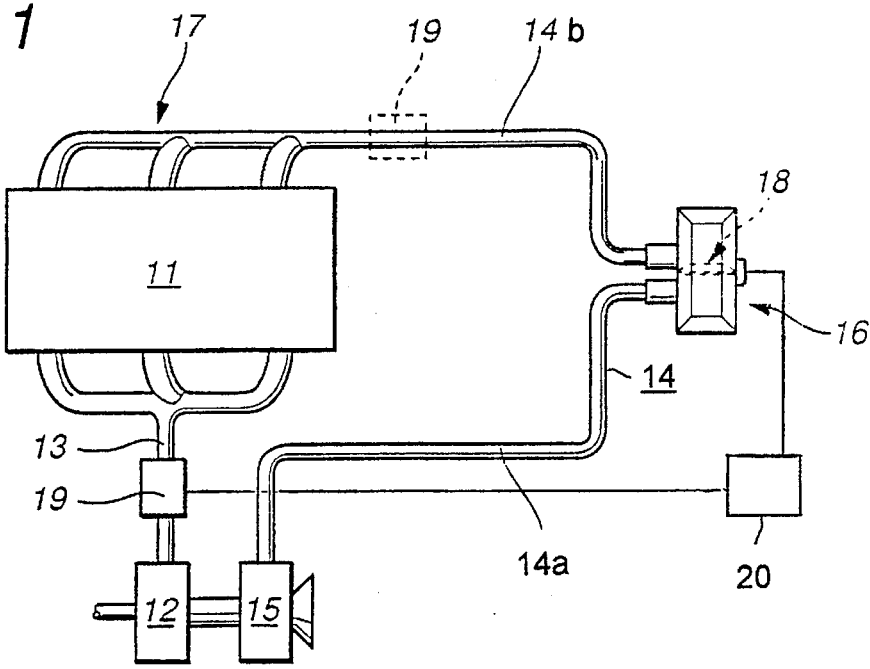
FIG. 1 is a schematic representation of the arrangement according to the invention.

FIG. 1 shows schematically an internal combustion engine 11 which includes an exhaust gas turbocharger 12, 15 for charging the engine 11, an exhaust gas pipe 13 and a charge air duct 14. The exhaust gas pipe 13 leads to an exhaust gas turbine 12 which is coupled to an air compressor 15 to form a turbocharger 12, 15. A charge air duct 14 leads from the compressor 15 to an intercooler 16 and from the intercooler 16 to an air intake manifold 17 of the engine 11. Upstream and downstream of the intercooler 16 the charge air duct 14 is continuous and is connected directly to the compressor 15 and, respectively, the air intake manifold 17.

The intercooler 16 includes a air flow control mechanism 18. During warm-up of the engine the air flow control mechanism is in an open position so that the charge air supplied to the intercooler 16 through the upstream air duct 14a is directly transferred to the downstream air duct 14b so as to by-pass the cooler. In this way, the operating temperature of the engine 11 is rapidly increased so that the fuel-air mixture, the exhaust gas quality and also the power output capability of the engine are improved. When the engine 11 has reached a certain operating temperature which is measured, for example, by a temperature sensor 19 arranged in the exhaust gas pipe 13 or in the charge air duct 14, the air flow control mechanism 18 is closed. Then the charge air flow is diverted through the heat exchanger of the intercooler 16 where it is cooled thereby avoiding the disadvantages occurring with excessive air temperatures such as knocking, damage to the catalytic converter because of excessive exhaust gas temperatures or reduced air delivery because of a reduced charge air density resulting from the excessive air temperature.

The limit temperature of the engine 11 may be supplied to a control unit 20 which may receive other sensor values such as engine rpm, engine temperature, cooling water temperature, charge air pressure and possibly knocking signals for processing. Dependent on these characteristic values the air flow control mechanism 18 can be adjusted to any desired position between fully closed and fully open by the control unit (which may be integrated with the engine management system) in order to achieve optimal engine power and exhaust gas quality.

Figure 2:
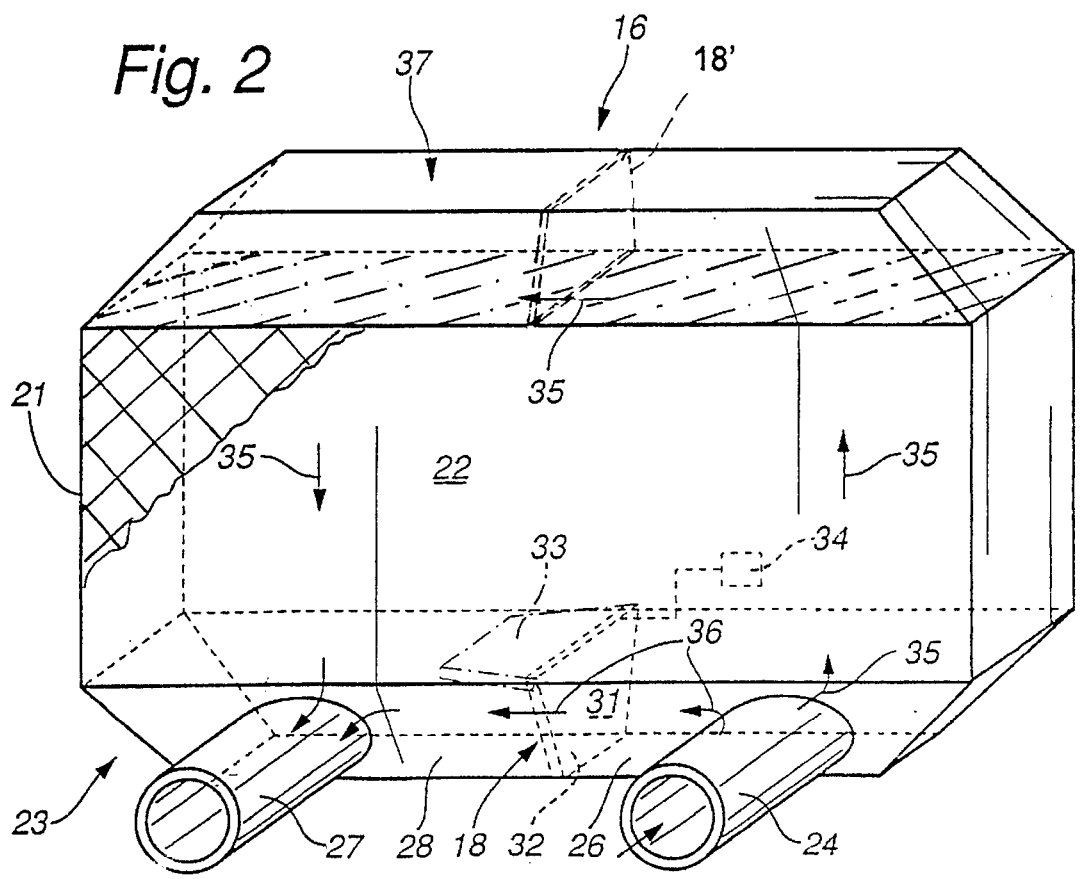
FIG. 2 is a perspective schematic view of an intercooler.

FIG. 2 is a schematic representation of the intercooler 16. The intercooler 16 comprises a housing 21 including a cooler 22, particularly a heat exchanger preferably in the form to provide a U-shaped flow path for the charge air. The lower part 23 of the housing 21 comprises an air inlet area 26 and an air outlet area 28 which are separated by the air flow control mechanism 18. A connecting duct piece 24 is provided for the inlet area 26 for supplying charge air thereto and a connecting duct piece 27 is provided for the outlet area 26 for receiving the charge air from the intercooler. The upstream charge air duct 14a extends between the compressor 15 and the connecting duct piece 24 and the downstream charge air duct 14b extends between the connecting duct piece 27 and the engine intake manifold 17.

The air flow control mechanism 18 may simply be a pivotally mounted flap 31 which is movable between a closed position 32 (shown by dashed lines) and an open position 33 (shown by dash-dotted lines) and which is adjustable by an operating device 34 under the control of the control unit 20.

In the open position 33 of the air flow control mechanism 18 the charge air flow entering the air inlet area 26 follows the path indicated by arrows 36 past the air flow control flap 18 to the air outlet area 28 and leaves the air outlet area through the connecting duct piece 27 to be supplied to the engine 11. When the air flow control mechanism 18 is closed after the engine 11 has reached a predetermined temperature, the charge air stream arriving from the compressor 15 enters the inlet area 26 through the connecting duct portion 24 and flows through the intercooler 16 in a U-shaped path which is indicated by the arrows 35 and which leads to the exit area 28 from where the charge air exits through the connecting piece 27 after having been cooled in the intercooler. However, with a different design of the heat exchanger of the intercooler 16 the air flow through the intercooler may follow a different path.

The connecting duct pieces 24, 27 are arranged at a relatively small distance from the air flow control mechanism 18 in order to provide for a short flow path when the air flow control mechanism is in its open position 33. The connecting pieces 24, 27 extend essentially normal to the front side of the intercooler 16 and are disposed parallel to one another so that the charge air duct sections 14a, 14b can easily be connected thereto. However, depending on design parameters, the connecting duct pieces may be arranged opposite one another or extend along the longitudinal axis of the housing 21. Also the connecting duct pieces 24, 27 may be mounted to the top part of the housing 21 or they may be disposed at an angle with respect to one another.

The air inlet area 26 and the air outlet area 28 preferably include guide vane baffles which provide for an efficient deflection of the air flow particularly when the air flow control mechanism 18 is in the open position.

The air flow control mechanism 18 is operated by the operating device 34 which may be specifically designed for the air flow control mechanism. For example, if the air flow control mechanism resides in a flap 31 the operating device may be mechanical or electrical. But it is also possible to provide a pneumatic, an electromagnetic or a hydraulic operating device 34 for actuating the air flow control mechanism 18. Also the air flow control mechanism 18 can be in the form of a butterfly valve, a magnetic valve, a two-way valve or another arrangement capable of controlling the air flow. The operating device 34 may be arranged within the housing 21 of the intercooler 16 or it may be arranged without. Independently of the type of the air flow control mechanism 18 utilized, it is necessary that the air flow control mechanism is temperature resistant and is capable of withstanding relatively high pressures and that it can close off the air inlet area 26 from the air outlet area 28 without leakage.

Other than as shown in FIG. 2 the U-shaped flow pattern can also be so arranged that the it extends in another direction through the cooling system 22.

It is further possible to provide an additional air flow control mechanism 18' in a switch back area 37 which provides for communication between the parts of the cooling system representing the opposite legs of the U-shaped flow pattern in which the charge air flows in opposite directions. Then the flow control mechanism 18' in the switch back area 37 would be closed when the flow control mechanism 18 in the lower part 23 of the housing is open and vice versa.

What is claimed is:

1. An internal combustion engine with an exhaust gas turbocharger in communication with said engine by a charge air duct for supplying combustion air to said engine, said charge air duct including an intercooler with a housing having a cooling structure for cooling the air compressed by said turbocharger before it is supplied to said engine, an inlet area connected to an upstream section of said charge air duct which is connected to said turbocharger and, adjacent said inlet area, an outlet area connected to a downstream section of said charge air duct for supplying the charge air to said engine, an air flow switch back area provided in said intercooler housing opposite said air inlet and outlet areas, a first air flow control mechanism arranged between said inlet and outlet areas, a second air flow control mechanism disposed in said switch back area and operating means for actuating said air flow control mechanism including temperature sensing means for sensing engine operating temperature for holding said air flow control mechanism open until a predetermined engine operating temperature has been reached to permit the charge air to flow from said inlet area directly to said outlet area as long as said air flow control mechanism is open and to direct said air flow through the cooling structure of said intercooler when said flow control mechanism is closed.

2. An internal combustion engine according to claim 1, wherein connecting duct pieces are mounted on said housing one in communication with said inlet area and the other in communication with said outlet area and said upstream duct section extends directly between said turbocharger and said inlet area connecting duct piece and said downstream duct section extends directly between said outlet area duct piece and said engine.

3. An internal combustion engine according to claim 2, wherein said inlet and outlet area connecting duct pieces are arranged essentially parallel to one another and at a distance from said air flow control mechanism.

4. An internal combustion engine according to claim 1, wherein said air flow control mechanism is a pivotable flap.

5. An internal combustion engine according to claim 4, wherein said pivotable flap is adjustable to any position between fully open and fully closed end positions in a stepless fashion.

6. An internal combustion engine according to claim 1, wherein an operating mechanism is operatively connected to said air flow control mechanism for operating said air flow control mechanism under the direction of a control unit.

7. An internal combustion engine according to claim 1, wherein said cooling structure is a heat exchanger with a U-shaped passage for the charge air.

* * * * *